(12) United States Patent
Kehler et al.

(10) Patent No.: US 7,086,627 B2
(45) Date of Patent: Aug. 8, 2006

(54) ADHESIVE TAPE FOR JOINING THE START OF A NEW PAPER ROLL TO THE END OF AN OLD, EXPIRING PAPER ROLL

(75) Inventors: Harald Kehler, Hamburg (DE);
Bernhard Gebbeken, Hamburg (DE);
Christoph Nagel, Hamburg (DE);
Klaus Kleinhoff, Rodenberg (DE)

(73) Assignee: Tesa AG, Hamburg (DE)

( * ) Notice: Subject to any disclaimer, the term of this patent is extended or adjusted under 35 U.S.C. 154(b) by 59 days.

(21) Appl. No.: 10/321,237

(22) Filed: Dec. 17, 2002

(65) Prior Publication Data

US 2004/0115427 A1 Jun. 17, 2004

(30) Foreign Application Priority Data

Dec. 13, 2002 (DE) .................. 102 58 667

(51) Int. Cl.
*B65H 19/18* (2006.01)
*B32B 7/12* (2006.01)

(52) U.S. Cl. .................. 242/556.1; 242/556; 428/354; 428/40.1; 428/343; 428/42.2; 156/304.1

(58) Field of Classification Search ............ 242/556.1, 242/556; 428/354, 343, 40.1, 42.2; 156/304.1
See application file for complete search history.

(56) References Cited

U.S. PATENT DOCUMENTS

| | | | |
|---|---|---|---|
| 2,377,971 A | 6/1945 | Roesen | 242/58 |
| 2,920,835 A | 1/1960 | Gibson | 242/58.5 |
| 3,006,568 A | 10/1961 | Willis | 242/58.5 |
| 5,212,002 A | 5/1993 | Madrzak | 428/40 |
| 5,348,793 A | 9/1994 | Stettner | 428/211 |
| 5,901,919 A | 5/1999 | Wienberg | 242/556.1 |
| 5,916,651 A | 6/1999 | Wienberg et al. | 428/40.1 |
| 5,996,927 A | 12/1999 | Weirauch et al. | 242/556.1 |
| 6,416,604 B1 | 7/2002 | Nootbaar et al. | 156/157 |
| 6,595,461 B1* | 7/2003 | Storbeck et al. | 242/556.1 |
| 2004/0115427 A1* | 6/2004 | Kehler et al. | 428/343 |

FOREIGN PATENT DOCUMENTS

| | | |
|---|---|---|
| CA | 2113932 | 3/1995 |
| DE | 1006786 | 4/1957 |
| DE | 1 267 930 | 5/1968 |
| DE | 38 34 334 A1 | 4/1990 |
| DE | 40 33 900 A1 | 10/1991 |
| DE | 42 10 329 A1 | 10/1993 |
| DE | 195 44 010 C2 | 5/1997 |
| DE | 196 28 317 A1 | 1/1998 |
| DE | 196 32 689 A1 | 2/1998 |
| DE | 198 30 673 A1 | 1/2000 |
| DE | 198 30 674 A1 | 1/2000 |

(Continued)

OTHER PUBLICATIONS

Abstract of EP 0418527 from EPO website database.

(Continued)

*Primary Examiner*—Daniel Zirker
(74) *Attorney, Agent, or Firm*—Norris McLaughlin & Marcus, P.A.

(57) ABSTRACT

An adhesive tape for splicing together two web materials comprises a first adhesive layer and a second adhesive layer both on the same face of a backing, wherein the first adhesive layer and the second adhesive layer overlap one another.

20 Claims, 6 Drawing Sheets

FOREIGN PATENT DOCUMENTS

| | | |
|---|---|---|
| DE | 199 02 179 A1 | 8/2000 |
| DE | 101 12 636 A 1 | 10/2002 |
| EP | 0 418 527 A2 | 3/1991 |
| EP | 0 566 880 B1 | 5/1996 |
| EP | 0 696 254 B1 | 9/1997 |
| EP | 0 757 657 B1 | 1/1998 |
| EP | 0 831 046 B1 | 6/2002 |
| FI | 81997 | 9/1990 |
| GB | 2 294 235 A | 4/1996 |
| WO | 90 08032 | 7/1990 |
| WO | 91 08159 | 6/1991 |
| WO | 93 12025 | 6/1993 |
| WO | WO 93/12025 | 6/1993 |
| WO | 95 29115 | 11/1995 |

OTHER PUBLICATIONS

Abstract of DE 3834334 from EPO website database.
Abstract of DE 19544010 from EPO website database.

* cited by examiner

ADHESIVE TAPE FOR JOINING THE START OF A NEW PAPER ROLL TO THE END OF AN OLD, EXPIRING PAPER ROLL

The invention relates to an adhesive tape for joining the start of a new paper roll to the end of an old, expiring paper roll.

In papermaking, in paper finishing by means, for example, of special coatings or calendering to increase smoothness, gloss, and specific weight, together with tensile strength, and in paper processing as well there are many processes which provide the consistent quality required only when they are performed continuously. For example, the thickness of a coating depends not only on the distance between the web to be coated and the doctor blade which draws the coat smooth but also on the rate of advance. Furthermore, a part is also played by the temperature of the product to be coated and the temperature of the coating material; both can only be consistent if the web speed is constant.

In addition to such technical requirements, moreover, the avoidance of readying times and the high efficiency which is gained as a result are factors in favor of an as far as possible continuous process technology.

The running length of paper lost as waste due to a possible restart, owing to the discontinuity during acceleration and for a short time thereafter as well, owing to the necessary dissipation of the unavoidable settling-in events, grows at approximately the square of the speed which is to be reached.

The importance of freedom from interruptions has increased in significance over the last 30 years by virtue of the drastic increases in the travel speeds of the machinery: within the printing sector, the highest travel speeds have been and are being run in newspaper printing, where since the 1980s, when particularly high-speed-compatible inks became available, they have reached between 30 km/h and 60 km/h, while in 1961 the customary speeds there were still between 1.39 m/sec (=5 km/h) and 4.16 m/sec (=15 km/h); in this regard see, for example, FIG. 4 on page 75 of the report by W. H. Banks, "Problems in High Speed Printing" on the International Printing Research Institute Conference held in 1961 at Elsinore, Denmark. The same speed range is indicated on page 80, lines 1 and 2, and is referred to in Tables 2 and 8 of the following pages up to page 86. This report was published by the PERGAMON PRESS.

In papermaking—where there is no need to take account of the rate of ink transfer—travel speeds of up to 120 km/h have in fact been achieved for 10 years, and these high speed machines have become more and more established, and are nowadays predominant.

Paper, however, can be neither supplied nor delivered as a continuous product of arbitrary length; instead, it takes the form of a wound coil having a winding length which, although large, is still finite. In cross section, therefore, a reel of this kind shows the form of an Archimedes spiral; since, however, the thickness of the paper is very low in relation to the diameter of the reel, a paper reel of this kind gives the appearance of a roll; accordingly, these paper reels are referred to in the jargon of those skilled in the art as "paper rolls".

The finite nature of the winding length gives rise to the problem that the start of the new roll must be joined to one end of the old roll in order to continue the manufacture or finishing or processing of the paper. In order to actualize the required continuity, this join must be made while the paper is traveling at an undiminished speed. Roll changeover under these circumstances is referred to by the skilled worker as "flying".

A variety of adhesive tapes have already been disclosed for effecting a roll changeover. For instance, U.S. Pat. No. 2,920,835, published in 1960 and since known to the skilled worker as, so to speak, the mother of all modern adhesive paper splicing tapes, discloses an essentially two-part adhesive tape of which one part 4, which is described as the "underlying paper piece", is intended to take over the actual splicing function, i.e., the connection between the end of the old web and the start of the new web, and a part 1 or 5 is intended to take over the function of fastening the topmost winding of the new roll, which must be accelerated for synchronization of the old web before the flying splice is carried out, to the winding which is second from the top. This latter function may be referred to correctly as "roll fastening". Said document deals at length with the problem of how the roll fastening acquires the necessary separability which is required as soon as the splice comes about by pressing of the new, prepared roll onto the old web. In order to optimize the first-mentioned function, FIG. 3 of said document, in connection with the use of a permanently tacky adhesive (as they were called at the time in order to delimit them from those adhesives which become tacky only by moistening; nowadays they are called "pressure sensitive adhesives"), teaches the use of a cover tape (now also called "liner") divided into two by a slit 10 in order first of all to expose only a first adhesive zone for adhering beneath the start of the new roll and only then a second adhesive zone for adhering beneath the end of the new web.

Said document also already teaches that the area of adhesive which served as a roll fastening until the splice was carried out is left, after it has torn, in the non-tacky state as a result of extracted paper fibers which remain on the adhesive (see column 2, lines 27 and 28).

The last-mentioned problem is dealt with in more detail by the 1961 publication U.S. Pat. No. 3,006,568 which teaches from column 2, line 63 to column 3, line 11 further possibilities of ensuring that the adhesive of the roll fastening which has done its job is left in a nontacky state, the importance of this being emphasized. Like the preceding patent before it, this patent too contents itself with a tape which bonds only part of the axial width of the roll web, referred to as a "tab" or "tag" or "label". This is true both for the joining function and for the fastening function. The unbonded regions are cut at acute angles to the peripheral direction, which prevents them flapping or tearing off.

During the rotary acceleration of the new roll, which is required for a flying splice before the join is made, in order to approximate the web speed at the periphery of the new roll to the speed of the expiring paper web, centrifugal forces act within the coil and aerodynamic forces act at the periphery. The forces of both categories grow at a square of the increasing speed. For this reason, the strength of the roll fastening must increase considerably if the splice is to be performed at a relatively high speed. The strength both of the roll fastening and of the web join has been increased in recent decades, in step with the changes in speed, by an increase in the adhesive area. For this purpose, first of all the number of the tabs (and hence also of the "V"s in the paper cut at the ends) was increased, and, finally, bonding was carried out over the entire axial extent of the new roll.

Both of the aforementioned US documents envisage a splice formed such that the beginning of the new web and the end of the old web are both located on the same side of the tab. (The separable roll fastening is disposed on the underside.) This leads to a serial arrangement of both joins of the paper web ends, with the consequence of an admittedly longer region of increased flexural rigidity in the assembled web as compared with a splice where the two joins are arranged one above the other, but with a flexural rigidity which is by far not so drastically increased in this splicing region, on account of the fact that only two and not three layers lying one above the other have been bonded to one another, even in the region in which three layers—including, that is, the tail end of the old web—lie one above another. A splice of this kind is referred to as "equal-sided".

An equal-sided splice is also taught by FI-89 0287, which was filed in Finland Jan. 19, 1989 (Application No.: 81997) and was published Sep. 28, 1990. It focuses on the slitting of the liner of the two adhesive splicing areas lying one behind the other, but does not cite the end use as being for a flying splice and, probably for that reason, does not refer to any roll fastening; from this and from the fact that the small residual "tail", typical of a flying splice is to be cut off completely, leading to a "butt splice", the skilled worker concludes that this splice is to be performed statically, in other words at standstill, and not flying, with the paper running uninterrupted. Part of the same patent family is WO 90/08032, published Jul. 26, 1990.

WO 91/08159 on the other hand, published Jun. 13, 1991, deals again with the problem of the separability of the roll fastening and the need for the adhesive which brings about the roll fastening to be left no longer tacky after the fastening has torn, and proposes for this purpose the very same kind of splittable paper as already proposed by U.S. Pat. Nos. 2,920,835 and 3,006,568.

Likewise addressing the problem of the separable roll fastening is CA 2,113,932, filed Jan. 21, 1994 and published Mar. 21, 1995, which indicates an adhesive tape having a splittable paper backing 12 and also pressure sensitive adhesive layers 14 and 16 (one on the top and one on the bottom of said backing 12) which in turn are each protected up until the time of their use by a liner tape 18 or 20, respectively.

DE 195 44 010 C2, filed Nov. 27, 1995 and published May 28, 1997, also discloses this but without any restriction to the roll fastening. Although this adhesive tape is a double-sided adhesive tape, only one side, namely the topside, is intended for joining the end of the old, expiring roll to the start of the new roll in a serial arrangement. The splice in this case too is therefore a single-sided splice.

The bottom adhesive side of the double-sided adhesive tape is designed in this case to be adhered to the winding which is second from the top, approximately at the point where the topmost winding of the new roll ends, at the beginning of the joining operation. Subsequently, the topmost winding is to be attached over it, on the topside of the adhesive tape, in such a way that it occupies a part, a third for example, of the upper adhesive layer. The new roll, held together by the lower adhesive layer, is then accelerated to the correct web speed, i.e., synchronized, and then attached to the end of the old roll by that part of the upper adhesive layer which is still free.

At the moment of attachment, the holding together of the new roll, which was hitherto essential, must be undone in order to allow the roll to unwind. This is done here by the splitting of the paper backing, a solution which was already explicitly referred to by the aforementioned U.S. Pat. No. 3,006,568 in column 3, line 9, and also by WO 91/08159. As already explained in these earlier documents, the excess remnants of the lower adhesive layer of this double-sided adhesive tape do not disrupt the subsequent course of the process in the papermaking or paper finishing or paper processing operation, since residues of paper adhere to said layer.

A disadvantage of this solution, however, is that owing to the splitting of the paper in a way which is not entirely controllable the strength of the paper backing is adversely effected. In unfavorable cases there could be such extensive weakening of the paper backing that the remaining remnants of the paper backing would no longer be sufficient to bridge the boundary between the paper of the old roll and paper of the new roll with sufficient strength and stability; in such a case, tearing would occur. Owing to the requirement depicted at the outset for continuous manufacture, to the high level of waste if this requirement is not met, and to the downtime of these same manufacturing plants, which are extremely capital-intensive, just a single tear on a large plant costs around €15 000.

Consequently, the older DE 40 33 900 A1, which was filed Oct. 25, 1990 and published Oct. 10, 1991, appears to the present-day skilled worker to be more favorable. Here, in order to produce a bridgelike bond between the end of an old paper web and the start of a new paper web, an adhesive tape is used which has an adhesive layer essentially only on its topside. The cover sheet of this adhesive layer is composed of two parts (4 and 5) separated from one another by a longitudinal seam (9). Applied to the underside of the backing, preferably on one edge of the adhesive tape, is a narrow adhesive strip (7 or 70), likewise with a cover sheet (8).

The adhesive force of this adhesive strip toward paper is said to be substantially higher than toward the adhesive tape backing to which the adhesive strip adheres by its other side. This narrow adhesive strip serves to fasten this adhesive tape and hence the topmost winding to the winding second from the top of the new paper roll, the bond strength ratio mentioned being intended to bring about the separation of this bond at the moment when the start of this new roll has joined, by virtue of the adhesive tape, to the end of the old roll, and specifically a separation such that the adhesive strip (7 or 70) remains on the roll (which is referred to therein as a drum), i.e., detaches from the bridging adhesive tape. As indicated by column 2, lines 12 and 13, said adhesive strip (7 or 70) can also be a double-sided adhesive tape.

This document admittedly does not mention that the remainder of the adhesive strip (7 or 70) which remains on the winding second from the top following its detachment from the bridging adhesive tape is no longer tacky on its detachment surface; however, since the need for it to be left nontacky had been self-evident to the skilled worker for a very long time (see the aforementioned U.S. Pat. Nos. 2,920,835 and 3,006,568 and also WO 91/08159) this is obvious to the skilled worker.

For use in the papermaking industry it is necessary that the entire adhesive tape be repulpable, and so the adhesive tape backing must be made of paper. On a paper backing, the simplest way of promoting the detachment on the side facing the adhesive strip (7/70) is to roughen the paper backing at that very spot.

DE 694 07 822 T2, the German translation to EP 0 757 657 B1, filed in accordance with the PCT on Oct. 27, 1994, published Nov. 2, 1995, likewise discloses an adhesive tape for use for a splice during flying roll changeover (in short: "flying splice"). In delimitation from the aforementioned prior art, this document (see, for example, the last feature of claim 1) emphasises that the outer surface of the ply second from the top of the new roll is left in a nontacky condition after the centrifugal force protection has been removed, and in doing so the document picks up the threads of the more detailed considerations from the aforementioned U.S. Pat. No. 3,006,568 and from U.S. Pat. No. 2,920,835, although not acknowledging them.

DE 694 07 822, like U.S. Pat. No. 2,920,835 and FI-89 0287 before it, divides the adhesive side of the adhesive tape that is situated radially outward on the new roll to be prepared for splicing, in other words the area of a part of the backing of a splicing section that is referred to, in accordance with one restriction, as the "first area", into two adhesive layers lying in series. The purpose of the first of these layers is to fasten the leading end of the new roll to the backing part and the purpose of the second is to fasten the backing part to the further web material of the expiring roll. The first adhesive layer is intended to extend over the width of the backing part, essentially from the first longitudinal edge of the backing part to a "first position" situated toward its center, while the second adhesive layer is intended to begin at or behind said first position, without overlapping with it, and to extend over the width of the backing part to a "second position", which is situated toward the second longitudinal edge of the backing part. In all of the examples, both adhesive layers are produced in one piece from the same adhesive.

The figures of this document, particularly FIGS. 6, show that said "first position" coincides with the point at which the liner tape is slit and so is divided into two halves 10 and 11. FIG. 11 of this document shows a more expensive to prepare but easier to handle embodiment according to which both liner tape halves 10 and 11 are situated not flush against one another but centrally above one another, like roof tiles, to make the projecting, filmlike end of the liner tape easier to grasp.

In the case of DE 694 07 822 as well the problem remains that the second adhesive layer—particularly at its start—is loaded more vigorously in slip and shear than the first adhesive layer. The reason for this is that, with the roll at standstill, the first adhesive layer can be adhered to the paper of the new roll and, furthermore, by prompt preparation of the splice, the adhesive there can be given many seconds, or indeed a time in the range of minutes, in order to attain full stability, whereas the second adhesive layer has to develop the necessary stability within the millisecond range and, furthermore, is heftily loaded by virtue of the fact that 100% synchronization is never completely achieved, so that the small difference in web speed which remains at the time of contact discharges itself in a jolt, while a small slip and the maximum shear stress occurs in the join.

In order to solve this problem it is familiar to the skilled worker—as in the products of the tesa® EasySplice® family, which in the meantime have become substantially established in the market—to make the more highly loaded second adhesive layer broader than the first, so that, as viewed in the running direction of the paper, the second adhesive layer is longer than the first.

The products of the tesa® EasySplice® family also have a mechanism for separating the roll fastening, i.e., the temporary connection between the topmost winding and the winding second from the top of the new paper roll, namely by paper splitting, as already taught in U.S. Pat. No. 2,920,835 and U.S. Pat. No. 3,006,568. As set out by DE 196 32 689 A1 (and, from it, EP 0 831 046 B1), the adhesive layer (7/70) referred to by the citation addressed above is replaced here by a double-sided adhesive tape with a paper backing of the kind, approximately in its center, which splits at the moment of detachment. In this context there is similarity with the above-acknowledged CA 2,113,932; however, in accordance with DE 196 32 689 A1, it is not the main paper backing which splits but rather only the second paper backing, arranged in the lower adhesive strip, which has no importance for the strength and stability of the bridge between the start of the new roll and the end of the old roll.

Further patents relating to the EasySplice® product family are DE 196 28 317 A1, DE 198 30 673 A1, DE 198 30 674 A1 and DE 199 02 179 A1.

Further patents relating to flying splices and to adhesive tapes suitable for this purpose are U.S. Pat. No. 2,377,971, DE-B 12 67 930, EP 0 566 880 B1, EP 0 696 254 B1, DE 38 34 334 A1, WO 93/12025, and DE 42 10 329 A1. Known, furthermore, as a fasten for packaging for photographic roll films and the like is DE-B 10 06 786. Known in addition from the search report relating to EP 0 831 046 B1 are GB 2 294 235 A, WO 91/08159 A, WO 95/29115 A, and EP 0 418 527 A.

The inventors set themselves the object of providing a further means or a further measure to ensure that the "second adhesive layer" in the terminology of DE 694 07 822 T2 stands up to the high load.

Starting from the generic features, which are formulated in accordance with DE 694 07 822 T2 (the closest prior art in our opinion), as follows: an adhesive tape (K) for joining two material webs (I, II), preferably for joining the start (A) of a new paper roll (P) to the end (E) of an old, expiring paper roll, a) said tape (K) being suitable to be adhered at least substantially transversely over the material webs (I, II) to be joined, b) said tape (K) having a backing (1) which is preferably composed of paper, c) on whose (1) top face a first adhesive layer (2.1) and a second adhesive layer (2.2) are disposed, d) the first adhesive layer (2.1) being intended to attach to the start (A) (=the leading end) of the new web (I), e) while the second adhesive layer (2.2) is intended to attach to the end (E) of the old, expiring material web (II), f) the first adhesive layer (2.1) extending, in the dimension of the width of the adhesive tape (K), from a first position (a) in the vicinity of a first boundary edge (4.1) of the backing (1) to a second position (b) located between the two boundary edges (4.1, 4.2) of the adhesive tape (K) or at the second boundary edge (4.2), g) and the second adhesive layer (2.2) extending, in the dimension of the width of the adhesive tape (K), from a third position (c) located between the two boundary edges (4.1, 4.2) of the backing (1) of the adhesive tape (K) to a fourth position (d) in the vicinity of the other boundary edge (4.2) of the backing (1), the solution provided by the invention is that wherein h) the second position (b) is located further from the first boundary edge (4.1) of the backing (1) than is the third position (c), i) so that the second adhesive layer (2.2) overlaps the first adhesive layer (2.1).

As a result of the overlying of two adhesive layers a relatively high thickness of adhesive is reached in the region of the overlap according to the invention. Thus at the beginning of contact a relatively large compression is built up in the region of overlap and, as a result, the slip during compensation of the small, unavoidable synchronization deficits is reduced. This slip reduction is to the benefit of the load-bearing capacity per unit area of the bonding area regions which come into contact subsequently, even if the compression per unit area in these bonding area regions which come into contact subsequently is to be reduced by the concentration of compression to the start. This advantage can be utilized in the form of a further increase in product reliability and/or in the form of a narrowing of the adhesive tape, thereby further reducing the running uniformity disturbances which occur when the site of the splice passes through apparatus such as roll pairs, etc.

To further optimize the different bonding regions to the two different bonding instances, the two bonding areas are appropriately prepared from two different adhesives.

In this case the formula of the adhesive of the first adhesive layer (2.1)—which is intended to fasten the start, i.e., the leading end, of the new roll and so to preserve it from unwanted unwinding before it is joined to the end of the old web—that is, the adhesive which can be brought, so to speak, at rest to its full shear resistance and which will be referred to below as the first adhesive—should be formulated for a higher shear resistance than the second adhesive. The higher resistance is preferably twice as high, with particular preference four times as high.

For measuring the shear resistance:
  The adhesives are coated onto a 25 µm polyester film in a thickness such that 25 g of adhesive are applied per $m^2$. After the drying and possible crosslinking of the adhesive, a strip 13 mm wide and at least 20 mm long is cut out and bonded to a defined paper type, preferably gravure paper "Neopress T 54" from StoraEnso or coating basepaper, e.g., Mediaprint 135 $g/m^2$. The bonding area is rectangular with the dimensions 13 mm×20 mm.
  In order to ensure a constant applied pressure during bonding, the test specimen is over-rolled twice, slowly, with a roller weighing 2 kg. The test specimen produced in this way is loaded with a weight of 1 kp (=9.865 N) parallel to the bonding plane, and the time for which the adhesive strip remains on the paper is measured.
  For more effective differentiation between different adhesives, the test can be carried out at different testing temperatures; unless otherwise stated, the temperature is room temperature, i.e., approximately 21° C.

As well as the benefit of a further increase in resistance and thus a further reduction in the frequency of failure, this specialization of the adhesive also makes it possible to keep the first adhesive layer of the adhesive splicing tape particularly narrow—that is, to keep it particularly short as viewed in the running direction of the paper to be joined. The shortening of the bonding zones that is possible in this way brings about a reduction in the attendant disturbance to uniformity in the running of the paper when the splice site runs through roll pairs or over deflecting rollers or other working devices.

The first adhesive has a shear resistance which is preferably at least 40% greater than that of the second adhesive; optimally its shear resistance is greater by a factor of at least 3.

It is further advisable for the formula of the second adhesive, i.e., the adhesive of the second adhesive layer (2.2)—which is intended to attach within a very short contact time to the end of the old, expiring material web (preferably: paper web), which is running at full speed—to be formulated for a higher tack than the formula of the first adhesive. In order to exploit this degree of freedom which has been gained it is advisable to make the tack of this second adhesive greater by a factor of at least 3 than the tack of the first adhesive, preferably by a factor of between 8 and 12. It is acceptable here that the shear resistance of the second adhesive is less than that of the first; at least in those cases where this is accepted, this second adhesive layer ought—in a way which in principle is known per se—to be broader than the first adhesive layer in order to compensate this disadvantage, to conform to the teaching that a chain is only as strong as its weakest link.

Whereas to date a nonuniformity was known to the extent that the first bonding zone, serving to attach the start of the new roll, occupied about 40% of the width of the adhesive tape and the remaining 60% were accounted for by the attachment to the old, expiring web, this nonuniformity when using two differently specialized adhesives is increased preferably to a figure of between 30% to 70% and 20% to 80%. The reason for this is that the specialized formulation of the adhesive of the first zone for particularly high shear resistance allows an even greater quality improvement and hence reduction in the width of the bonding zones than does the specialized formulation of the adhesive of the second zone for high tack.

When using two different adhesives it is further advisable that in the region of overlap the more strongly adhesive (more tacky) adhesive layer overlies the more weakly adhesive layer, i.e., the second over the first. Accordingly, the more tacky adhesive layer comes to lie facing the counterpiece that is to be bonded (in this case paper), and the advantage of the high initial bonding is maximized. For this it is necessary to accept the more tacky adhesive layer being located further from the adhesive tape backing in the region of overlap, although this has hardly any disruptive effect especially when the first adhesive layer below it is—as recommended—particularly shear-resistant.

In accordance with a further development of the invention, the first adhesive layer extends over the entire width of the adhesive tape. With this arrangement as well, an increase in compression is achieved at the beginning of the entry of the second adhesive layer into the contact zone. As compared with a variant in which the first adhesive layer is not applied over the full area—in other words, namely the words of feature k), where the first adhesive layer extends to a second position (b) which is located between the two boundary edges of the adhesive tape—this variant is easier to produce. Specifically, it avoids the danger of including air bubbles at the site at which otherwise the second adhesive layer would come down onto the backing: instances of detachment may occur starting from such inclusions.

With this full-area embodiment of the first adhesive layer as well it is advisable to utilize different adhesives for both adhesive layers. Here again, the more tacky (second) adhesive layer should be situated at the top, in other words at a greater distance from the backing, while the more shear-resistant (first) adhesive layer lies at the bottom, in other words closer to the backing or, preferably directly on the backing.

Precisely when the first adhesive layer of high shear resistance is present fully and directly on the backing, it exhibits the initially unexpected additional effect that, in fact, the tear propagation resistance of the backing is apparently increased. According to experience, the reason for this is a kind of gap-bridging effect. This advantage can be utilized for the purpose of reducing still further a tearing rate which is already extremely low in any case, or of allowing even higher paper running speeds or reducing still further the thickness of the backing, which would further reduce the disruption to smooth running during splice travel.

The preferred developments specified for the version with a first adhesive layer which is not applied over the full area also apply analogously to the version with the first adhesive layer applied over the full area. In particular, therefore, it is sensible here as well for the second adhesive layer—which in accordance with the further development is of high tack—to extend over more than 60% of the width of the adhesive tape.

In comparison, the variants whose first adhesive layer is not applied over the full area have, on the one hand, the advantage of being able to manage with less adhesive, and hence of being able to be somewhat cheaper, and secondly of keeping the region of highest flexural rigidity in the splice smaller and so of improving the smooth running of the paper that is being produced or processed, as compared with the current state of the art.

Preferably, with the invention, it becomes possible to give a narrower dimension to the adhesive strip for joining the two paper webs, thereby minimizing the disruptive influence of the strip in the further processing of the paper. For example, the imbalance in a roll containing a splice would be reduced. Instead of this, or additionally, however, the optimization of the second adhesive layer can also be utilized to allow greater slip and so to allow the jerk which is produced during joining, as result of the synchronization mismatch, to be particularly gentle, which could be the key to a further increase in the permissible paper running speed.

The invention is illustrated below with reference to two exemplary embodiments, the first of which is depicted two-dimensionally in FIGS. 1 to 7 and the second in FIGS. 8 to 14; for simplification, the third dimension has not been depicted, which can be allowed here since the sectional planes depicted is [sic] constant over the entire length of the adhesive tapes depicted and over the width of the paper webs to be joined. Moreover, the preferred width of an adhesive splicing tape of the invention, at (depending on application) 2.5 cm to about 7 cm, is smaller by several orders of magnitude than the diameter of the new paper roll, which in present-day standard practice can be between 80 cm and 3 m, which is why the curvature of the corresponding paper web sections of the new roll has likewise not been depicted. Given this, FIG. 1 shows an adhesive splicing tape of the invention whose first adhesive layer does not extend over the entire width of the adhesive tape;

Figure 5:
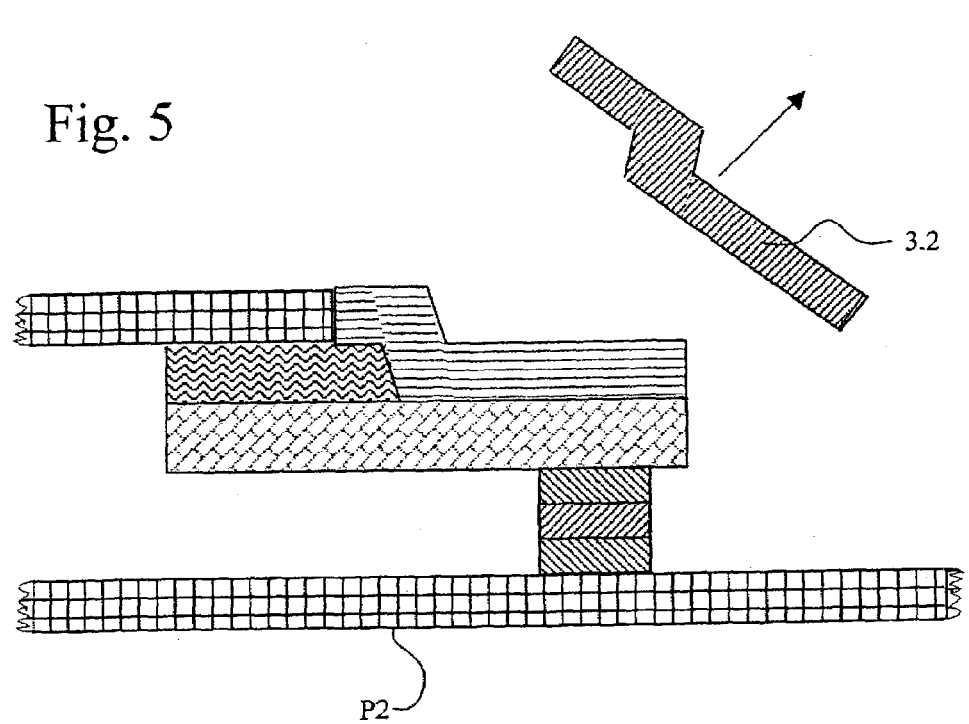
FIG. 5 shows the same as FIG. 4 but following removal of the line of tape from the second adhesive layer, after which the paper roll will now actually be accelerated.
Figure 6:
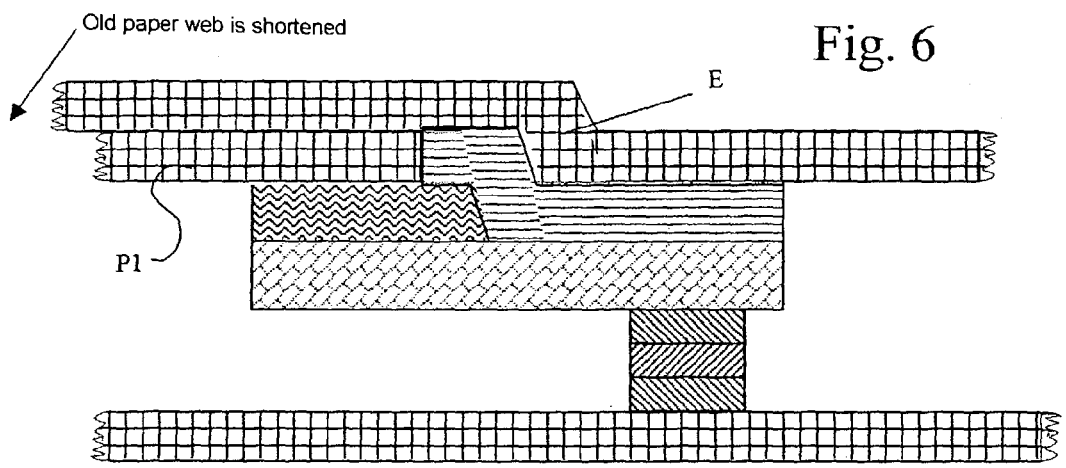
Figure 7:
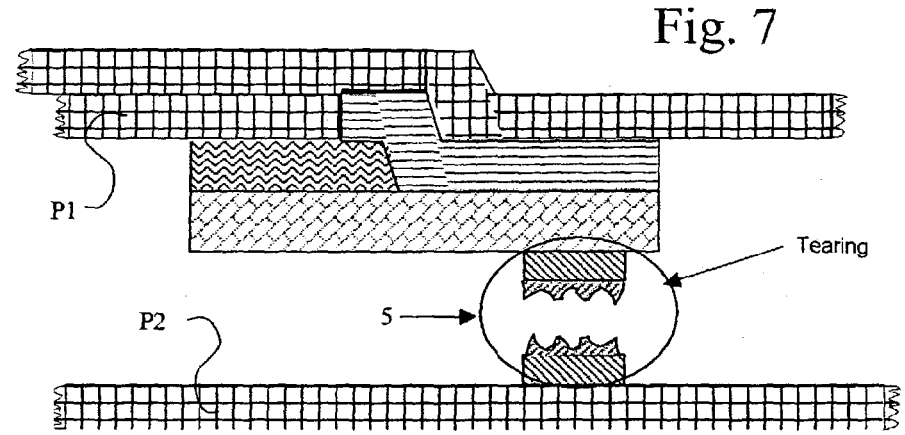

FIG. 6 shows the moment at which the new paper roll, prepared as per FIG. 5 and accelerated to the correct rotational speed, is led up to the old paper web and pressed against it, after which the two paper webs are bonded; and, finally, FIG. 7 shows the tearing—which occurs about half a millisecond to one millisecond later—of the fasten of the new paper roll P, so that the following wound plies can now be removed as well.

Figure 8:
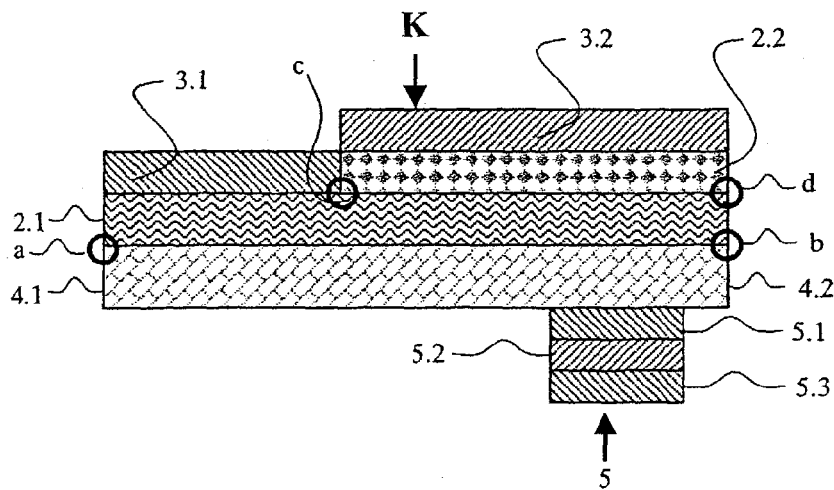
Figure 9:
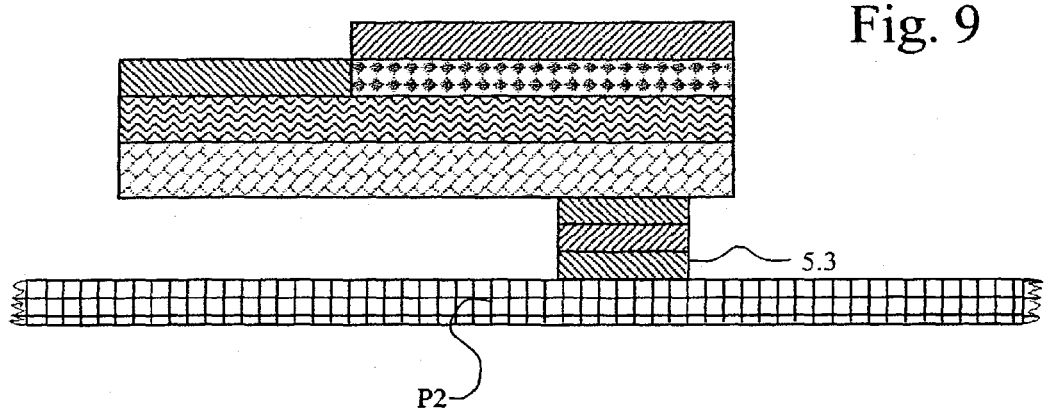
Figure 10:
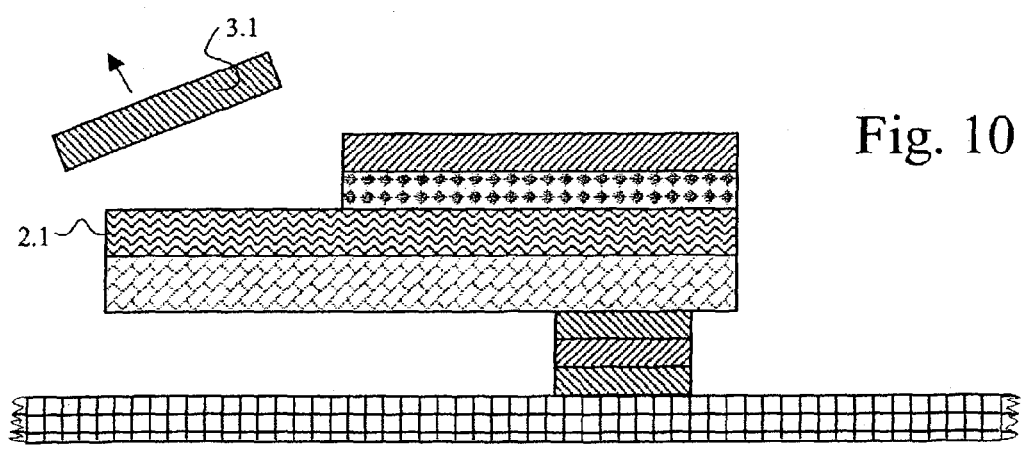
Figure 11:
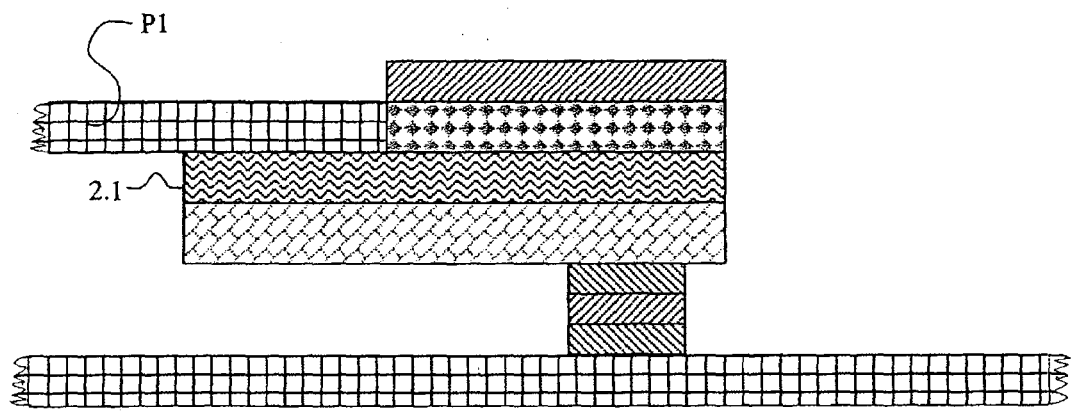
Figure 12:
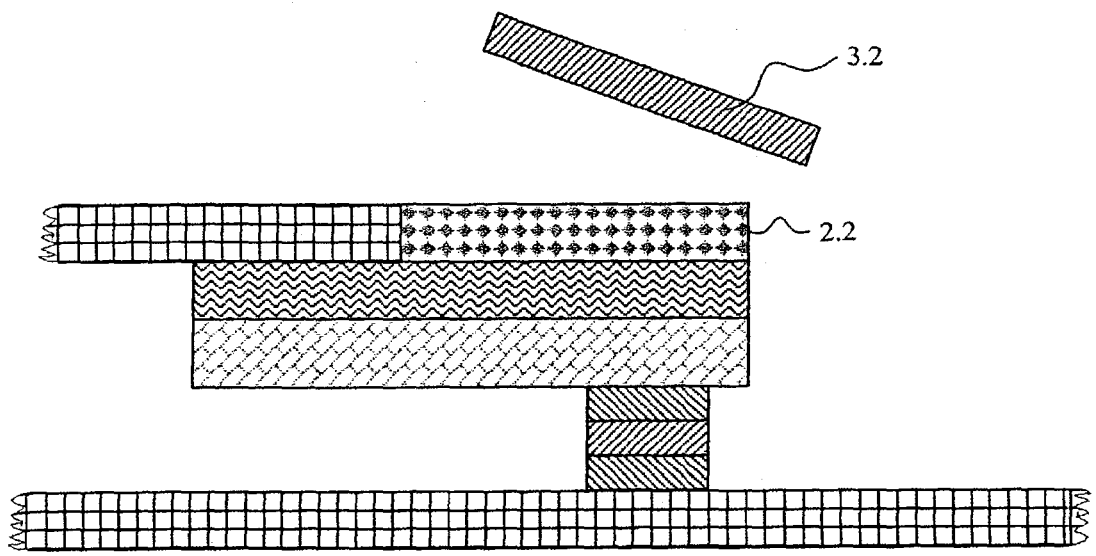
Figure 13:
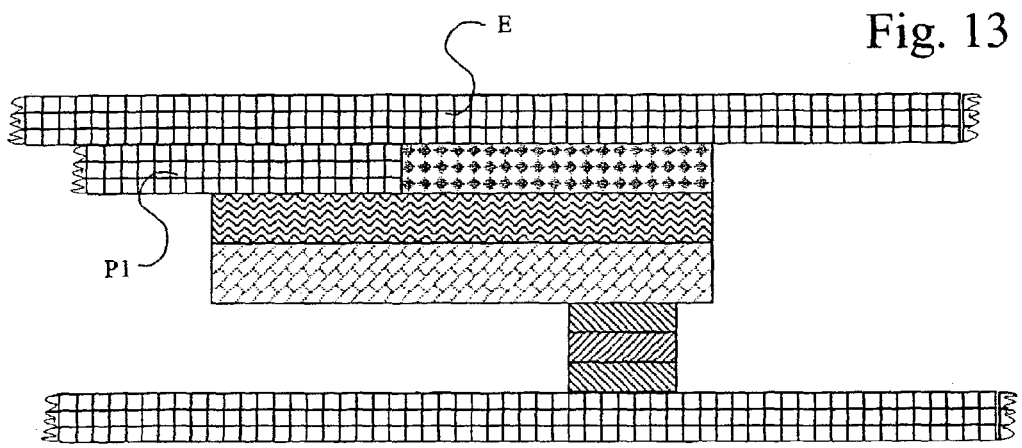
Figure 14:
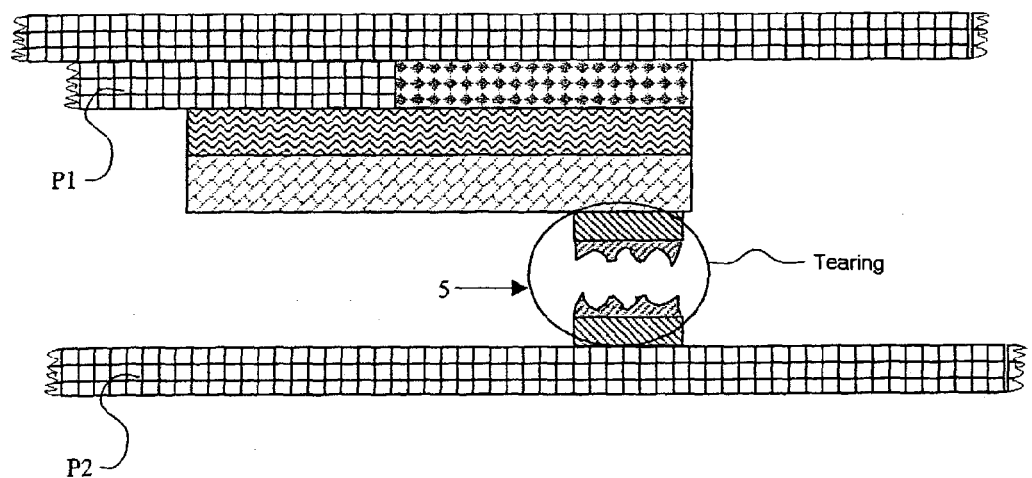

Referring to the second, especially preferred exemplary embodiment, in a completely analogous sequence FIG. 8 shows an adhesive splicing tape of the invention whose first adhesive layer does not extend over the entire width of the adhesive tape;

FIG. 9 shows the same adhesive tape as FIG. 8 but now already adhered to the paper ply or winding second from the top of the new paper roll;

FIG. 10 shows the same as FIG. 9 but with now the liner tape already removed from the first adhesive layer;

FIG. 11 shows the same as FIG. 10 but with now the topmost paper ply (=topmost or final winding) of the new paper roll already adhered to the subregion of the first adhesive layer that has been exposed through the prior removal of the liner tape, after which the new paper roll thus prepared is fastened and, as a result, is resistant to centrifugal force;

FIG. 12 shows the same as FIG. 11 but following removal of the line of tape from the second adhesive layer, after which the paper roll with its bonding-ready adhesive layer will now actually be accelerated;

FIG. 13 shows the moment at which the new paper roll, prepared as per FIG. 12 and accelerated to the correct rotational speed, is led up to the old paper web and pressed against it, after which the two paper webs are bonded; and, finally, FIG. 14 shows the tearing—which occurs about half a millisecond to one millisecond later—of the fasten of the new paper roll P, so that the following wound plies can now be removed as well.

Figure 1:
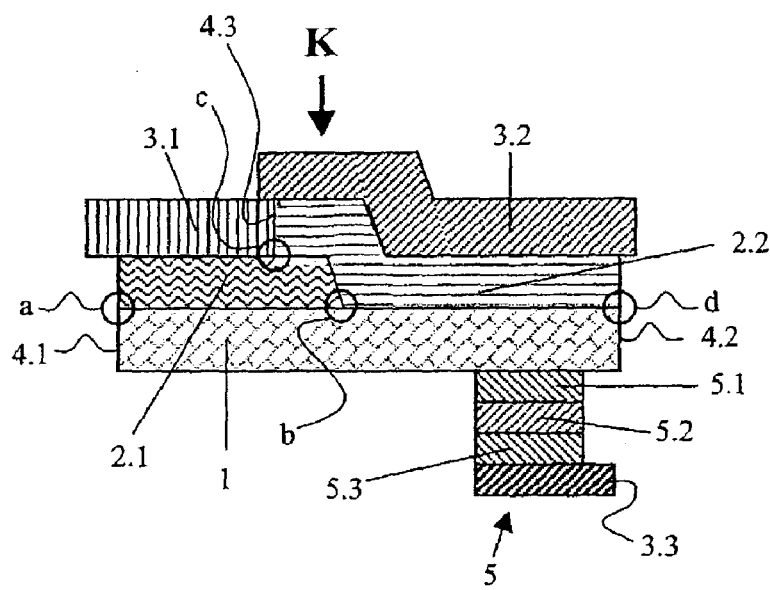

FIG. 1 shows an adhesive splicing tape K of the invention whose first adhesive layer 2.1 does not extend over the entire width of the adhesive tape; instead, it extends from a first position, labeled "a", which should be at least in the vicinity of a first boundary edge 4.1 and which in this exemplary embodiment is located exactly at the boundary edge 4.1, to a position b, which in the figures lies further to the right and yet is still nearer to the first boundary edge 4.1 shown on the left than to the second boundary edge 4.2 shown on the right.

The second adhesive layer 2.2 of said adhesive tape K extends on the same side of the backing 1, which in the context of this specification is also referred to as the top face; specifically, it extends from a position c, which is also called the "third position", to a position d, which is also called the "fourth position". The particular feature of the invention here is that position c is nearer to the first boundary edge 4.1 than is position b. In other words, in the assignment of sides which has been chosen in the figures, c is further to the left than b. In both exemplary embodiments, the fourth position d is not only in the vicinity of the other (right) boundary edge 4.2 of the backing but in fact is exactly there.

As a result of the feature of c being to the left of b, the regions a–b and c–d overlap, with the two adhesive layers 2.1 and 2.2 overlapping between c and b. If, as preferred, both adhesive layers are composed of different adhesives, the first adhesive layer 2.1, here depicted on the left, ought to have a higher shear resistance than the second second [sic] adhesive layer 2.2, which is on the right and has an overlap, while the latter layer (2.2) ought to have the higher tack.

In a manner known per se, both adhesive layers 2.1 and 2.2 ought each to be lined with a liner tape 3.1 and 3.2 respectively, in which case the liner tape 3.1 need of course only extend rightward to the extent that the adhesive layer

2.1, which extends further rightward, is not already covered in any case by the adhesive layer 2.2.

The adhesive tape K of the invention will be particularly simple to produce were the left boundary edge of the liner (or liner tape) 3.1 to be positioned precisely at the left boundary edge 4.1 and the right boundary edge of the liner 3.2 precisely at the right boundary edge 4.2. However, the adhesive tape K of the invention is easier to use if the liner tapes 3.1 and 3.2 project beyond the lined bonding area to some extent, at least on one side, since in that case they are easier to grasp with the fingers for the purpose of initiating a detachment. This situation is depicted in FIG. 1, while in all subsequent figures this detail has been omitted in order, firstly, for this less expensive solution to be illustrated and, secondly, to concentrate attention on what is essential to the invention.

The material chosen for the backing 1 here, as for the exemplary embodiment depicted in FIGS. 8 to 14, is a paper which is of high strength but is soluble in water and is therefore repulpable. Prior to the application of the adhesive layers, the backing 1 may have been treated on one and/or [sic] both sides with adhesion promoters.

Figure 2:
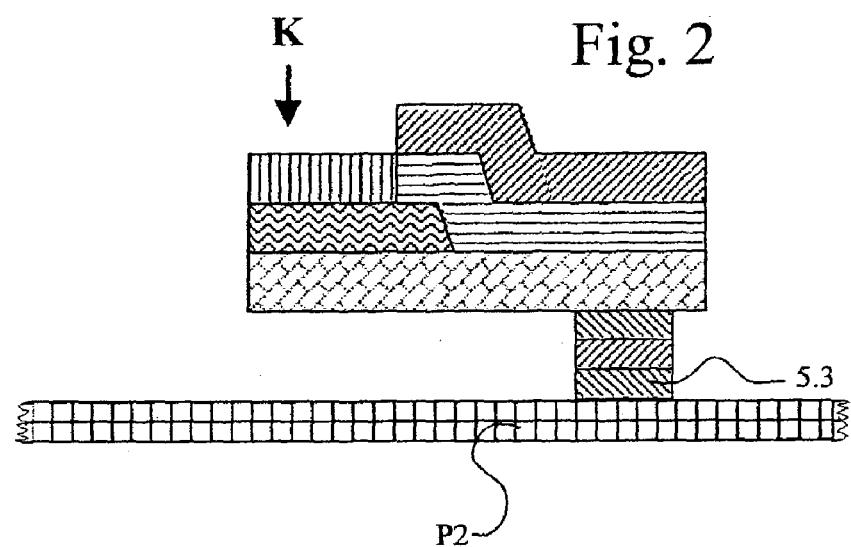
FIG. 2 shows the same adhesive tape as FIG. 1 but now already adhered to the paper ply or winding second from the top of the new paper roll.

On the side of the backing 1 which is opposite to the two adhesive layers, and which is also referred to in this specification as the bottom face, there is appropriately a separable fastening 5 whose purpose is to secure the new paper roll—which does not appear until FIG. 2—against premature unwinding in the acceleration phase. For the present invention, any desired design of separable fastenings is possible; preference, however, is given to a fastener as is known per se from DE 196 28 317.5 and is also depicted here: this fastener 5, between its two adhesive layers 5.1 and 5.3, has a ply 5.2 of splittable paper which splits approximately along its middle plane at the moment of opening of the fasten. It is unimportant here whether the splittable paper acquires the property of splittability by virtue of the fact that it is composed of two layers whose chosen cohesion is higher than the adhesion of the separable adhesive layer located between them or by virtue of the fact that the paper is more highly compacted in its surface regions and is therefore stronger than in its middle regions, or by virtue of other means.

In order to maintain its functional capacity reliably even during storage and transit, the lower adhesive layer 5.3 of this separable fastener, which is labeled 3.3, has a liner tape. This liner tape may also finish flush, but is preferably designed to protrude on at least one side, as shown here. It is also possible—as shown in FIGS. 8 to 14—to omit the liner tape 3.3 entirely, if the liner tape 3.2 has release properties not only on its bottom face but also on its top face, as a result, for example, of waxing or siliconization. In that case the top face takes over the function of 3.3 as well.

FIG. 2 shows the same adhesive tape K as FIG. 1, but here the lower liner 3.3 has already been removed and the adhesive tape K has been adhered by means of the adhesive layer 5.3 to the paper ply P2 or winding second from the top of the new paper roll.

Figure 3:
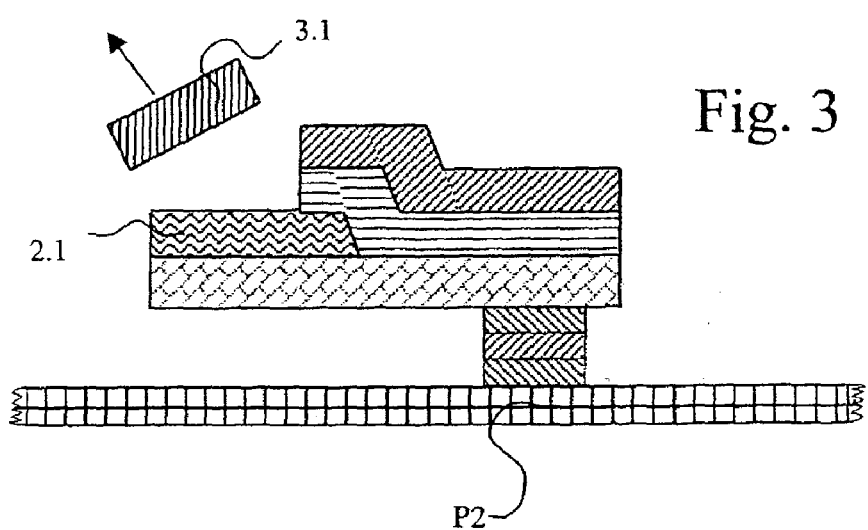
FIG. 3 shows the same as FIG. 2 but now with the liner tape already removed from the first adhesive layer.

FIG. 3 shows the same as FIG. 2, but now the liner tape 3.1 has already been removed from the adhesive area 2.1.

Figure 4:
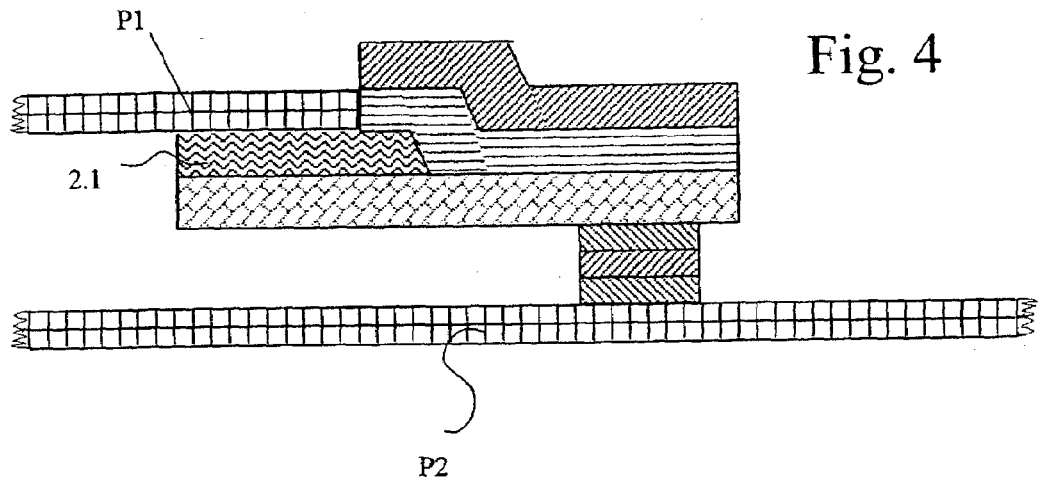
FIG. 4 shows the same as FIG. 3 but now with the topmost paper ply (=topmost or final winding) of the new paper roll already adhered to the subregion of the first adhesive layer that has been exposed through the prior removal of the liner tape, after which the new paper roll thus prepared is fastened and, as a result, is resistant to centrifugal force.

FIG. 4 shows the same as FIG. 3, but now the topmost paper ply P1 (=topmost or final winding) of the new paper roll has already been adhered to the subregion of the adhesive area 2.1 that was exposed by the prior removal of the liner tape 3.1, after which the new paper roll thus prepared has been fastened and, as a result, is sufficiently resistant to centrifugal force and to wind that it could be brought to rotational speed with the old paper web (not yet shown here) for the purpose of maximum synchronization; however, this does not yet take place immediately thereafter.

FIG. 5 shows the same as FIG. 4, but after removal of the liner tape 3.2 from the adhesive layer 2.2, after which the paper roll with its bonding-ready adhesive layer 2.2 is now actually accelerated.

FIG. 6 shows the moment at which the new paper roll, prepared in accordance with FIG. 5 and brought to rotational speed n to an extent such that the web speed of its outermost winding P1, i.e., n×π×D, coincides substantially with the web speed of the old paper web, is led up to the end E of the old paper web and pressed against it, after which the two paper webs bond.

Finally, FIG. 7, starting from a web speed of approximately 120 km/h, shows the tearing of the fastener 5 of the new paper roll, which occurs about half a millisecond to one millisecond later, accompanied by detachment of the topmost ply P1 of the new paper roll from its ply P2 second from the top. Thereafter, it is also possible to remove its subsequent wound plies.

FIGS. 8 to 14 refer to the second, especially preferred exemplary embodiment, and show it in a completely analogous sequence. As was already the case in the preceding FIGS. 2 to 7, in FIGS. 9 to 14 as well the slight curvature of the paper windings (roll diameter approximately 2 meters) in comparison with the width of the adhesive tape (preferably 7 cm) is disregarded.

FIG. 8 shows an adhesive splicing tape K of the invention whose adhesive area 2.1 disposed on its top face extends over the entire width of the adhesive tape. Position "b" has therefore shifted rightward to such an extent that it comes to lie exactly below position "d". Just as in FIG. 1, position "a" lies at least in the vicinity of the first boundary edge 4.1, preferably—shown here—precisely thereon. Analogously, "d" lies at or on the second boundary edge 4.2.

With this exemplary embodiment as well, the second adhesive layer 2.2 of the adhesive tape K extends on the same side of the backing 1 as the first adhesive layer 2.1.

Retaining the nomenclature of the first example, the first adhesive layer 2.1 extends from position "a" to position "b" and the second adhesive layer 2.2 extends from position "c" to position "d". The particular feature of the invention is that position c is nearer to the first boundary edge 4.1 than is position b. In other words, in the assignment of sides chosen in the figures, c is further to the left than b.

As a result of the particular feature that c is left of b, the regions a-b and c-d overlap, with the two adhesive layers 2.1 and 2.2 overlapping between c and b; in this example, therefore, the width of the overlap is equal to the width of the second adhesive layer 2.2.

If, as preferred, both adhesive layers are composed of different adhesives, then the first adhesive layer 2.1, in this case depicted on the left or further down, ought to have a higher shear resistance than the second second [sic] adhesive layer 2.2, which is situated on the right and overlapping, while the latter layer (2.2) ought to have the higher tack.

In a manner known per se, the two adhesive layers 2.1 and 2.2 ought each to be lined with a liner tape 3.1 and 3.2 respectively, in which case the liner tape 3.1 need of course only extend rightward to the extent that the adhesive layer 2.1, which extends further rightward, is not already covered in any case by the adhesive layer 2.2. In order to be able to produce the adhesive tape K of the invention in a particularly simple manner, the left boundary edge of the liner (or liner tape) 3.1 here (in deviation from FIG. 1) is disposed precisely on the left boundary edge 4.1, and the right boundary edge of the liner 3.2 precisely on the right boundary edge 4.2.

On the side of the backing 1 which is opposite to the two adhesive layers, and which is also referred to in this specification as the bottom face, there is appropriately a separable fastening 5, as already described in more detail for FIG. 1. It has the function of securing the new paper roll P—which does not appear until FIG. 9—against premature unwinding in the acceleration phase. The invention allows any desired design of separable fasteners; preference is given to one in accordance with DE 196 28 317.5, as is also depicted here: between its two adhesive layers 5.1 and 5.3, this fastener 5 has a ply 5.2 of splittable paper which splits approximately along its central plane at the moment of opening of the fastener.

FIG. 9 shows the same adhesive tape as FIG. 8, but now already adhered by means of the adhesive layer 5.3 to the paper ply P2 or winding that is second from the top of the new paper roll.

FIG. 10 shows the same as FIG. 9, but now the liner tape 3.1 has already been removed from the exposable portion of the adhesive area 2.1.

FIG. 11 shows the same as FIG. 10, but now the topmost paper ply P1 (=topmost or final winding) of the new paper roll has already been adhered to the subregion of the adhesive area 2.1 that was exposed by the prior removal of the liner tape 3.1, after which the new paper roll thus prepared has been fastened and, as a result, is sufficiently resistant to centrifugal force and to wind.

FIG. 12 shows the same as FIG. 11, but after removal of the liner tape 3.2 from the adhesive layer 2.2, after which the paper roll with its bonding-ready adhesive layer 2.2 is now actually accelerated.

In FIG. 13 the new paper roll prepared in accordance with FIG. 12 has already been brought to a rotational speed n such that its web speed at the outer periphery, i.e., n×π×D, coincides substantially with the web speed of the old paper web. This figure shows the moment at which the end E of the old paper web is led up and pressed, after which it bonds (forming the actual splice) to the top winding P1 of the new paper web.

And, finally, FIG. 14, starting from a web speed of approximately 120 km/h, shows the tearing of the fastener 5, which takes place about half a millisecond to one millisecond later, between the two peripheries P1 and P2 of the new paper roll. After this opening of the fastener, the following wound plies can also be removed.

In summary, the invention teaches building of a larger compression between the two webs at the beginning of contact of the new, prepared web with the old web, in order to allow better toleration of the small, unavoidable synchronization deficits when carrying out a flying splice. A concentration of compression at the beginning of the bonding sites in this way is achieved by placing two adhesive layers one above the other in at least a small region of overlap.

In an advantageous development of the invention, both adhesive layers are composed of different adhesives, with the first adhesive layer, which is intended for attachment to the start (A) of the new roll, being developed for a particularly high shear resistance, even if this is in competition with the achievable tack, while the second adhesive layer, which is intended for attachment to the end of the old, expiring material web, being developed for a higher tack.

An adhesive tape of the invention can be produced with particular ease if the first adhesive layer is applied over the full width of the adhesive tape while the second occupies only one region—the front region as viewed in the running direction of the material web direction [sic] to be joined; in that case the region of overlap of the two layers is large and is identical with the region of extent of the second layer.

The invention serves in particular to reduce further the rate of those tears which might be connected with a splice.

The following list of reference symbols is part of the description.

LIST OF REFERENCE SYMBOLS a site referred to as "first position" at least in the vicinity of (also includes "exactly at") the first boundary edge 4.1 of the backing 1 b site referred to as "second position", which is nearer to the other boundary edge 4.2 of the backing 1 than is position a nevertheless, b can be closer to the boundary edge 4.1 than to the boundary edge 4.2; b can also be on the boundary edge 4.2 (see second exemplary embodiment)

c site referred to as third position, located between the two boundary edges 4.1 and 4.2 of the backing 1 of the adhesive tape K and in accordance with the prior art at b or further toward 4.2, but in accordance with the invention nearer to 4.1 than b, which implies an overlap of two adhesive layers d site referred to as fourth position which is located in the vicinity of the other boundary edge (4.2) of the backing (1)

A start of P

E end of an old, expiring paper roll

K adhesive tape

P plies of the new paper roll, specifically
P1 topmost (or final) ply of the new paper roll P
P2 second-from-top (or penultimate) ply of the new paper roll P I first of two material webs (of new roll) to be joined II second of two material webs (of old roll) to be joined

1 backing of the adhesive tape

2 adhesive layers, specifically
2.1 first adhesive layer on top face of the backing 1, for unwind-secure fastening of the start A of the new roll P
2.2 second adhesive layer on top face of the backing 1

3 liner tapes, specifically
3.1 liner tape on adhesive layer 2.1
3.2 liner tape on adhesive layer 2.2
3.3 liner tape below adhesive layer 5.3

4 boundary edges of the backing 1, namely
4.1 first boundary edge
4.2 second boundary edge

5 separable fastener of the new paper roll P
5.1 adhesive layer of the separable fastener 5 for attachment to the backing 1
5.2 splittable paper for dissolving the fastening 5 and thus releasing the new paper roll for unwinding
5.3 adhesive layer of the separable fastening 5 for attachment to the second-from-top ply P2 of the new paper roll P

The invention claimed is:

1. An adhesive tape for splicing together two material webs, comprising:
a) a backing having first and second faces, first and second longitudinal edges, and first and second latitudinal edges;
b) a first adhesive layer on said first face, said first adhesive layer extending across a width of the backing from a first point at or near said first longitudinal edge towards a middle of said first face to a second point either i) at said second longitudinal edge or ii) between said first longitudinal edge and said second longitudinal edge;

c) a second adhesive layer on said first face, said second adhesive layer extending across the width of the backing from a third point between said first longitudinal edge and said second longitudinal edge towards said second longitudinal edge to a fourth point at or near said second longitudinal edge;

wherein the second point is located further from the first longitudinal edge than is said third point, so that the second adhesive layer overlaps the first adhesive layer.

2. The adhesive tape according to claim 1, wherein the backing is composed of paper.

3. The adhesive tape according to claim 1, wherein the first adhesive layer is composed of a different adhesive than the second adhesive layer.

4. A method of splicing a new web of material to an old, expiring web of material, comprising:
   a) providing an adhesive tape according to claim 1;
   b) adhering said first adhesive layer to a leading edge of said new web of material; and
   c) adhering said second adhesive layer to an end of said old, expiring web of material to splice said new web of material to said old, expiring web of material.

5. An adhesive tape for splicing together two material webs, comprising:
   a) a backing having first and second faces, first and second longitudinal edges, and first and second latitudinal edges;
   b) a first adhesive layer on said first face, said first adhesive layer extending across a width of the backing from a first point at or near said first longitudinal edge towards a middle of said first face to a second point either i) at said second longitudinal edge or ii) between said first longitudinal edge and said second longitudinal edge;
   c) a second adhesive layer on said first face, said second adhesive layer extending across the width of the backing from a third point between said first longitudinal edge and said second longitudinal edge towards said second longitudinal edge to a fourth point at or near said second longitudinal edge;
wherein the second point is located further from the first longitudinal edge than is said third point, so that the second adhesive layer overlaps the first adhesive layer; and
wherein the first adhesive layer is composed of a first adhesive and the second adhesive layer is composed of a second adhesive, and the first adhesive exhibits a higher shear resistance than the second adhesive, or the second adhesive exhibits a higher tack than the first adhesive, or a first bonding zone occupies at most only 30% of the width of the adhesive tape.

6. The adhesive tape according to claim 5, wherein the first adhesive layer is composed of a first adhesive and the second adhesive layer is composed of a second adhesive, and the first adhesive exhibits a higher shear resistance than the second adhesive.

7. The adhesive tape according to claim 6, wherein the shear resistance of the first adhesive is at least 40% greater than the shear resistance of the second adhesive.

8. The adhesive tape according to claim 7, wherein the shear resistance of the first adhesive is at least three times the shear resistance of the second adhesive.

9. The adhesive tape according to claim 7, wherein the shear resistance of the first adhesive is at least fifteen times the shear resistance of the second adhesive.

10. The adhesive tape according to claim 5, wherein the first adhesive layer is composed of a first adhesive and the second adhesive layer is composed of a second adhesive, and the second adhesive exhibits a higher tack than the first adhesive.

11. The adhesive tape according to claim 10, wherein the first adhesive exhibits a higher shear resistance than the second adhesive.

12. The adhesive tape according to claim 11, wherein the tack of the second adhesive is at least three times the tack of the first adhesive, both tacks being measured in accordance with PSTC-6 at a temperature of 25° C.

13. The adhesive tape according to claim 12, wherein the tack of the second adhesive is from eight to twelve times the tack of the first adhesive, both tacks being measured in accordance with PSTC-6 at a temperature of 25° C.

14. The adhesive tape according to claim 5, wherein a first bonding zone occupies at most only 30% of the width of the adhesive tape.

15. The adhesive tape according to claim 6, wherein at the point where the second adhesive layer overlaps the first adhesive layer, the first adhesive layer is positioned below the second adhesive layer.

16. The adhesive tape according to claim 10, wherein at the point where the second adhesive layer overlaps the first adhesive layer, the first adhesive layer is positioned below the second adhesive layer.

17. The adhesive tape according to claim 5, wherein the first adhesive layer extends over the entire width or the adhesive tape.

18. The adhesive tape according to claim 5, wherein the first adhesive layer does not extend over the entire width of the adhesive tape.

19. The adhesive tape according to claim 5, which has a width of less than 35 mm.

20. A method of splicing a new web of material to an old, expiring web of material, comprising:
   a) providing an adhesive tape according to claim 5,
   b) adhering said first adhesive layer to a leading edge of said new web of material; and
   c) adhering said second adhesive layer to an end of said old, expiring web of material to splice said new web of material to said old, expiring web of material.

* * * * *